United States Patent

Bauer

(10) Patent No.: US 9,859,928 B1
(45) Date of Patent: Jan. 2, 2018

(54) METHOD AND APPARATUS FOR DETECTING EMI SIGNALS USING A COMMON MODE SENSE AT THE DIFFERENTIAL PINS OF A CHIP

(71) Applicant: Marvell International Ltd., Hamilton (BM)

(72) Inventor: James Bauer, Lake Forest, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/863,262

(22) Filed: Sep. 23, 2015

Related U.S. Application Data (60) Provisional application No. 62/072,701, filed on Oct. 30, 2014.

(51) Int. Cl.
*H04B 1/10* (2006.01)
*H04B 1/12* (2006.01)
*H04L 25/08* (2006.01)
*H04L 25/02* (2006.01)

(52) U.S. Cl.
CPC ........... *H04B 1/1036* (2013.01); *H04B 1/123* (2013.01); *H04L 25/0292* (2013.01); *H04L 25/085* (2013.01)

(58) Field of Classification Search
CPC ... H04L 25/085; H04L 25/08; H04L 25/0292; H04L 25/0276; H04L 25/0272; H04L 25/0264; H04B 1/1036; H04B 1/1027; H04B 1/123; H04B 1/12; H04B 1/10; H04B 3/28; H04B 3/30; H04B 3/04
USPC .......................................... 375/257, 346, 350
See application file for complete search history.

(56) References Cited

U.S. PATENT DOCUMENTS

| | | | | |
|---|---|---|---|---|
| 6,940,973 | B1 * | 9/2005 | Yeap | H04M 3/18 375/285 |
| 7,315,592 | B2 * | 1/2008 | Tsatsanis | H04B 3/32 370/201 |
| 8,514,951 | B2 * | 8/2013 | Tavassoli Kilani | H04L 25/0274 375/257 |
| 2011/0292977 | A1 * | 12/2011 | Farjadrad | H04L 12/10 375/220 |

* cited by examiner

*Primary Examiner* — Betsy Deppe (57) ABSTRACT

In aspects of a common mode sense circuit for use at a chip's differential pins, a common mode sense circuit sums signals from a pair of connections comprising a twisted-pair cable differential connection. Differential connections are at an input of a chip, such as at an input to a receiver. Summed signals represent sensed common mode signals and may be further processed, such as summing the sensed common mode signals together, and supplied as a reference signal to an adaptive interference canceller.

22 Claims, 8 Drawing Sheets

METHOD AND APPARATUS FOR DETECTING EMI SIGNALS USING A COMMON MODE SENSE AT THE DIFFERENTIAL PINS OF A CHIP

CROSS REFERENCE TO RELATED APPLICATION(S)

This application claims priority to U.S. Provisional Patent Application Ser. No. 62/072,701 filed Oct. 30, 2014, the disclosure of which is incorporated herein by reference in its entirety.

BACKGROUND

Networks connect servers, remote users, and other peripherals using varieties of cabling. For example, IEEE 802.3 describes signaling at up to 10 gigabits per second over Ethernet cable comprising up to 100 meters of twisted-pair copper cabling. Furthermore, to support higher signaling rates demanded by advanced systems, modulation in hosts uses frequencies substantially higher than earlier systems. For example, Gigabit Ethernet technology uses frequencies up to 100 MHz, while more advanced 10 Gigabit Ethernet technology uses frequencies up to 500 MHz. Cables with longer lengths act like antennas, and together with higher operating frequencies, these long cables make advanced systems susceptible to interference from electromagnetic radiators. Interference can couple onto a twisted-pair cable and corrupt desired signals on the cable so that effective throughput is reduced or halted, causing the communication link to fail.

SUMMARY

This Summary introduces concepts of a common mode sense circuit for use at a chip's differential pins, and the concepts are further described below in the Detailed Description and/or shown in the Figures. Accordingly, this Summary should not be considered to describe essential features nor used to limit the scope of the claimed subject matter.

In one aspect, a method for processing a signal containing interference is described. The method includes receiving, with a common mode sense circuit, multiple differential inputs to a chip, and summing, with the common mode sense circuit, for each differential input of the multiple differential inputs, a pair of signals comprising the differential input to produce multiple sensed common mode signals, one sensed common mode signal for each differential input. The method also includes processing, with the common mode sense circuit, the multiple sensed common mode signals to produce a candidate sensed common mode signal, receiving, with an interference canceller, the candidate sensed common mode signal, and cancelling, with the interference canceller, at least some of the interference contained in the signal using the received candidate sensed common mode signal.

In yet another aspect, a device for processing a signal containing interference is described. The device includes a receiver including a chip. The device also includes a common mode sense circuit configured to receive at least one differential input to the chip, sum, for each differential input of the at least one differential input, a pair of signals comprising the differential input to produce at least one sensed common mode signal, one sensed common mode signal for said each differential input. The common mode sense circuit is also configured to process the at least one sensed common mode signal to produce a candidate sensed common mode signal. The device also includes an interference canceller configured to cancel at least some of the interference contained in the signal using the candidate sensed common mode signal.

In still another aspect, a system is described. The system includes a receiver including a chip, an integrated connector module, a common mode sense circuit, and an interference canceller. The integrated connector module is configured to couple at least one differential input to the chip so as to provide a connector interface from a signal containing interference to the chip. The common mode sense circuit is configured to receive at least one differential input to the chip, sum, for each differential input of the at least one differential input, a pair of signals comprising the differential input to produce at least one sensed common mode signal, one sensed common mode signal for each differential input. The common mode sense circuit is also configured to process the at least one sensed common mode signal to produce a candidate sensed common mode signal. The interference canceller is configured to cancel at least some of the interference contained in the signal using the candidate sensed common mode signal.

BRIEF DESCRIPTION OF THE DRAWINGS

Details of a common mode sense circuit for use at a chip's differential pins are described with reference to the following Figures. The same numbers may be used throughout to reference like features and components that are shown in the Figures.

DETAILED DESCRIPTION

Interference from electromagnetic radiators such as cellular phones, walkie-talkies, radios, and other computing devices may couple onto a twisted-pair cable and introduce a common-mode signal on the pair of wires comprising the twisted-pair cable. Since data signaling over the twisted-pair cabling uses differential signaling, corruption from the common-mode signal induced by the interferer can be significant, to the point of causing a link to fail and disrupt its data throughput. Since a transformer can be used to couple the twisted-pair cable to a chip included as part of a receiver, it is common to provide a common mode sense signal taken from a center-tap of the transformer. The common mode sense signal derived from the transformer's center tap, however, may require an additional pin on the chip, a dedicated interconnect to the chip with special routing to isolate the common mode sense signal from other signals, and higher cost of transformer construction.

In aspects of a common mode sense circuit for use at a chip's differential pins described herein, common mode signals are sensed at the differential inputs to the chip, such as from outputs of a transformer circuitry coupling a twisted-pair cable to the chip. Hence, an additional pin on the chip to accept a sensed common mode signal, and special routing for it, are not required. Furthermore, transformer cost can be reduced, as no special construction for provision of a sensed common mode signal from a center tap is required. In accordance with one or more embodiments, common mode signals are sensed at differential inputs to the chip using low-complexity circuits, such as adders, to sum the components of a differential input, thereby removing differential components while passing common mode components.

While features and concepts of a common mode sense circuit for use at a chip's differential pins can be implemented in any number of different devices, systems, environments, and/or configurations, aspects of a common mode sense circuit for use at a chip's differential pins are described in the context of the following example devices, systems, and methods.

Figure 1:
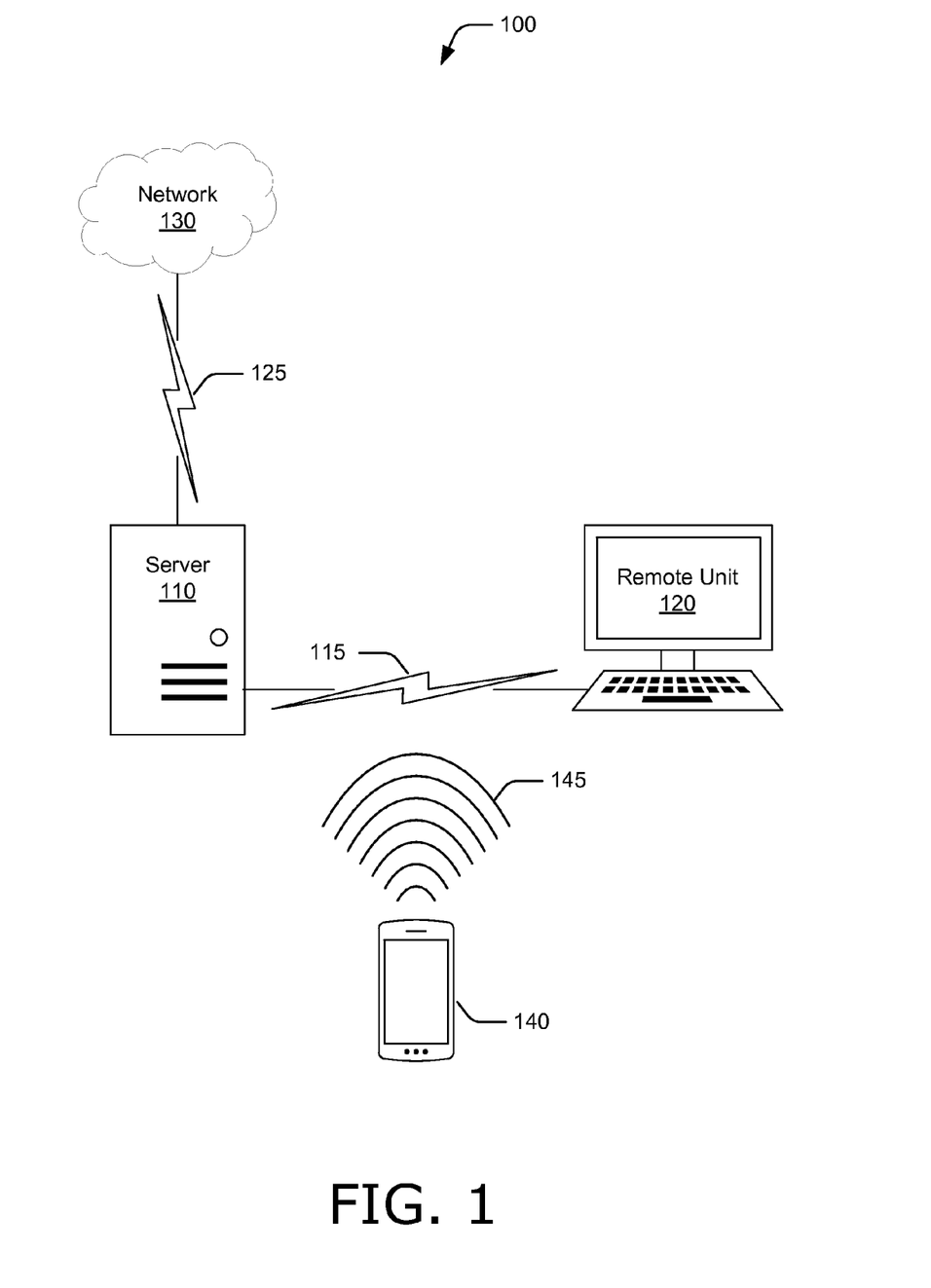
FIG. 1 illustrates an example operating environment including various computing devices in which aspects of a common mode sense circuit for use at a chip's differential pins can be implemented.

FIG. 1 illustrates an example environment 100 including various computing devices in which aspects of a common mode sense circuit for use at a chip's differential pins are implemented in accordance with one or more embodiments. Environment 100 includes, but is not limited to, server 110, communication link 115, and remote unit 120, so that server 110 and remote unit 120 are communicatively coupled through communication link 115. Though remote unit 120 is illustrated as a laptop computer, it is to be appreciated and understood that remote unit 120 can be any suitable type of computing device, such as another server, a user device such as a laptop or desktop computer, a network peripheral such as a router, or a tablet, a set-top box, satellite receiver, cable television receiver, access point, gaming device, navigation system, and the like. As such, environment 100 represents a server farm, cloud farm, corporate office, home office, gaming system, and the like.

Communication link 115 couples server 110 and remote unit 120 and may be any suitable communication link. For example, communication link 115 may comprise a wireless connection, wired connection, or a combination thereof. Furthermore, communication link 115 may comprise one-way or two-way (i.e., bi-directional) communications. In accordance with one or more embodiments, communication link 115 represents a communication link using signals compliant with an IEEE 802.3 standard, such as Gigabit Ethernet or 10 Gigabit Ethernet described in IEEE 802.3-2012 entitled "IEEE Standard for Ethernet", Dec. 28, 2012. In accordance with one or more embodiments, communication link 115 is implemented using a plurality of twisted-pair wire cables, such as four pair of twisted-pair wire cables.

Server 110 also uses communication link 125 to connect to network 130. Network 130 may be the Internet, an intranet, a local area network (LAN), wide area network (WAN), body area network (BAN), and the like. Communication link 125 may comprise a wireless connection, wired connection, or a combination thereof. For example, server 110 may connect remote unit 120 to the Internet by using co-axial cabling to connect to the Internet, and an Ethernet cable to connect to remote unit 120. Server 110 may be configured to supply data from remote unit 120 to network 130. In addition, server 110 may be configured to supply data from network 130 to remote unit 120. Furthermore, server 110 may be configured to supply data stored on server 110 to remote unit 120, and also to store data from remote unit 120 on server 110, such as on a hard drive or memory comprising server 110. Data may include video, audio, photographs, text, voice, and/or files, and the like.

Interferer 140 broadcasts signal 145 that couples onto communication link 115. Interferer 140 may be a walkie-talkie, cellular phone, radio, transmitter, computing device, network peripheral, hair dryer, magneto, and the like. In one or more embodiments, broadcast signal 145 is a data-bearing signal, such as a modulated radio frequency (RF) carrier carrying voice in a cellular phone conversation that is transmitted wirelessly in the form of electromagnetic radiation from an antenna comprising interferer 140. Additionally or alternatively, broadcast signal 145 may be electromagnetic radiation leaking from interferer 140, such as from electronic circuits, components, and cabling comprising interferer 140. For example, broadcast signal 145 may be radiated from a hair dryer in a home office environment. Therefore, broadcast signal 145 may be intentionally or unintentionally broadcast from interferer 140.

Broadcast signal 145 couples onto communication link 115. For example, in a communication link 115 comprising wired connections, such as using twisted-pair cables, the cables act as a receiving antenna and allow electromagnetic radiation from broadcast signal 145 to couple onto the cables, inducing an interference signal on communication link 115. In a communication link 115 comprising wireless connections, broadcast signal 145 may simultaneously occupy similar frequency spectra as data on communication link 115, and therefore appear as co-channel or adjacent channel interference to data on communication link 115. Interference can corrupt data being transferred between server 110 and remote unit 120 significantly, to the point of causing the data link to fail and disrupt its data throughput.

Server 110 and/or remote unit 120 may embody aspects of the disclosure. For example, server 110 and/or remote unit 120 may include general purpose and/or special purpose processors, application-specific integrated circuits (ASICs), field-programmable gate arrays (FPGAs), application-specific standard products (ASSPs), system-on-a-chip systems (SoCs), and/or complex programmable logic devices (CPLDs), collectively referred to as a "chip", any of which may embody aspects of a common mode sense circuit for use at a chip's differential pins.

Figure 2:
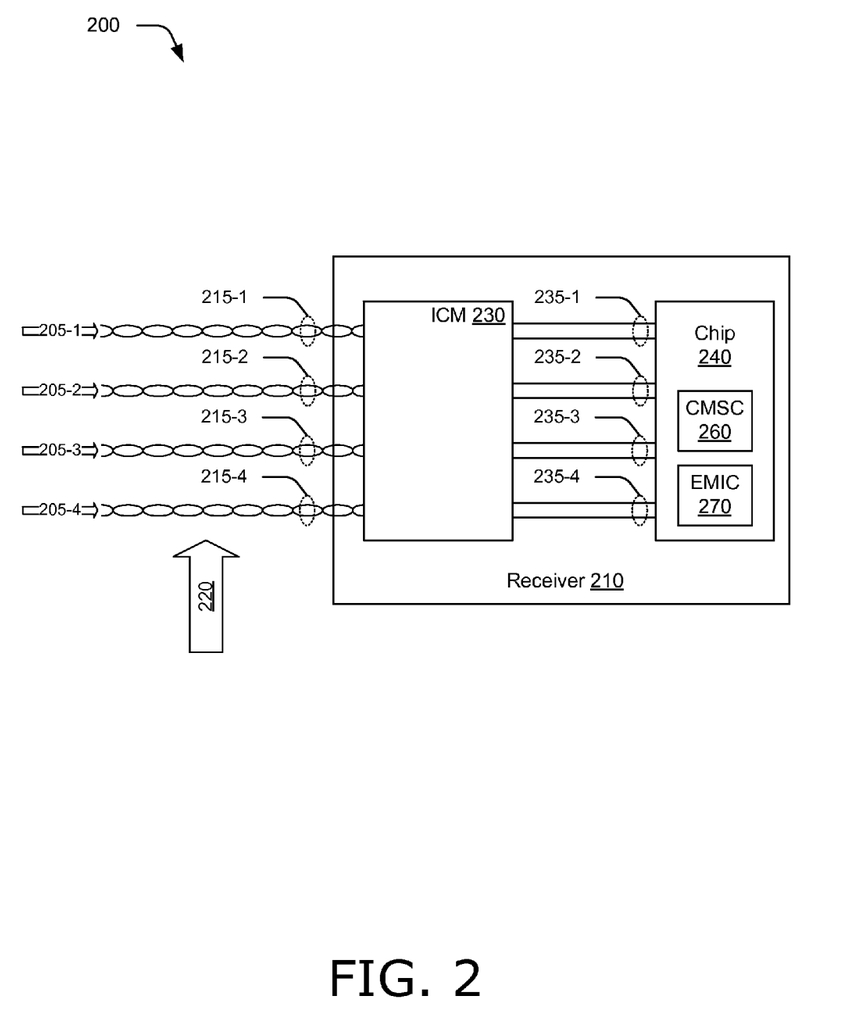
FIG. 2 illustrates an example block diagram in which aspects of a common mode sense circuit for use at a chip's differential pins can be implemented.

FIG. 2 illustrates an example diagram 200 in which aspects of a common mode sense circuit for use at a chip's differential pins can be implemented. Data-bearing signals 205-1-205-4 are input to receiver 210 transferred on twisted-pair cables 215-1-215-4, respectively. In one or more embodiments, data-bearing signals 205-1-205-4 are respectively transferred differentially over twisted-pair cables 215-1-215-4. For example, differential data on a twisted-pair cable may be transferred as a difference of signals on each wire comprising a twisted-pair cable. Furthermore, differential data may comprise data of opposite polarity on each wire comprising a twisted-pair cable. Twisted-pair cables 215-1-215-4 are an example of communication link 115 in FIG. 1. Though twisted-pair cables 215-1-215-4 are illustrated as comprising four pair of twisted-pair wire cables, it is to be appreciated and understood that twisted-pair cables 215-1-215-4 can comprise any number of any suitable type of cabling.

Interference 220 is coupled onto twisted-pair cables 215-1-215-4. For example, twisted-pair cables 215-1-215-4 act as an antenna and may couple electromagnetic radiation from interference 220 onto twisted-pair cables 215-1-215-4. Interference 220 may be coupled onto twisted-pair cables 215-1-215-4 in the form of a common mode signal. For example, a common mode signal couples a same voltage onto each wire comprising a twisted-pair wire cable.

Integrated connector module (ICM) 230 uses differential connections 235-1-235-4 to provide a connector interface from twisted-pair cables 215-1-215-4, respectively, to chip 240. ICM 230 couples data-bearing signals 205-1-205-4 to chip 240 using differential connections 235-1-235-4, respectively. ICM 230 also couples common mode interference induced by interference 220 to chip 240. Furthermore, ICM 230 may convert a portion of common mode interference induced by interference 220 to differential mode interference, and couple the differential mode interference to chip 240 using differential connections 235-1-235-4.

ICM 230, chip 240, and differential connections 235-1-235-4 comprise receiver 210. In one or more embodiments, chip 240 is an application-specific integrated circuit (ASIC). Alternatively, chip 240 may be a general purpose processor, special purpose processor, field-programmable gate array (FPGA), application-specific standard product (ASSP), system-on-a-chip (SoC), complex programmable logic device (CPLD), combinations thereof, and the like, and can be implemented as part of a network device, such as in server 110 and/or remote unit 120 in FIG. 1.

Receiver 210 performs functions to recover data comprising data-bearing signals 205-1-205-4. Furthermore, receiver 210 may transmit additional data on twisted-pair cables 215-1-215-4. Hence, receiver 210 may perform both transmit and receive functions, and may therefore comprise a transceiver. Receiver 210 includes chip 240, which includes common mode sense circuit (CMSC) 260 and electromagnetic interference canceller (EMIC) 270. Though CMSC 260 and EMIC 270 are illustrated as being included as part of chip 240, it is to be appreciated and understood that CMSC 260 and/or EMIC 270 can be implemented in any suitable component of receiver 210. For example, CMSC 260 and/or EMIC 270 may be implemented separately from chip 240. CMSC 260 and EMIC 270 are also coupled to differential connections 235-1-235-4 (shown in subsequent figures).

CMSC 260 senses a common mode signal on each pair of differential connections 235-1-235-4, processes the sensed common mode signals, and provides at least one candidate sensed common mode signal to EMIC 270. EMIC 270 uses a candidate sensed common mode signal from CMSC 260 to cancel interference in signals on differential connections 235-1-235-4. In one or more embodiments, EMIC 270 includes adaptive filters that update coefficients using a candidate sensed common mode signal from CMSC 260 as a reference signal in the adaptation process.

Figure 3:
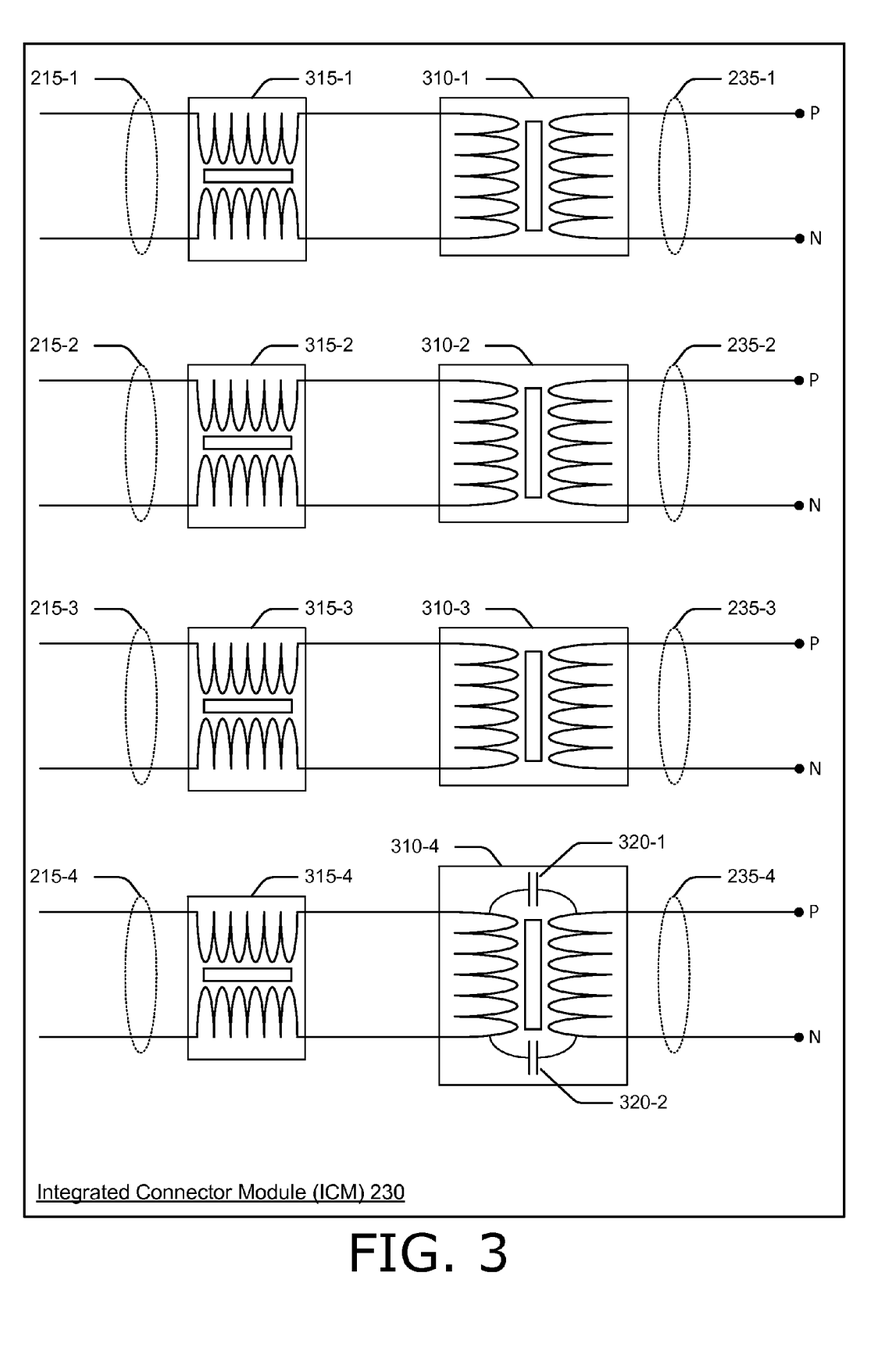
FIG. 3 illustrates an integrated connector module (ICM) in which aspects of a common mode sense circuit for use at a chip's differential pins can be implemented.

FIG. 3 illustrates an example integrated connector module (ICM) 230 in which aspects of a common mode sense circuit for use at a chip's differential pins can be implemented. Twisted-pair cables 215-1-215-4 are respectively coupled to differential connections 235-1-235-4 using two banks of coupled transformers, 310-1-310-4, respectively, and 315-1-315-4, respectively. Transformers 315-1-315-4 are respectively coupled to twisted-pair cables 215-1-215-4, and transformers 310-1-310-4 are respectively coupled to differential connections 235-1-235-4. Each pair of connections among differential connections 235-1-235-4 includes a positive side, labeled "P", and a negative side, labeled "N". For simplicity, FIG. 3 does not illustrate all connections and components that may comprise ICM 230, such as connections to ground, center-tap connections, resistors, capacitors, and the like. Those skilled in the art will appreciate that the example in FIG. 3 is illustrative only and does not purport to be limiting in any way.

Transformer 310-4 includes capacitors 320-1-320-2, which represent parasitic capacitances across transformer 310-4. Parasitic capacitances may exist due to physical properties of transformer 310-4, such as materials comprising the transformer, shape of the transformer, imperfections in the construction process of the transformer, number of windings in the transformer, and the like. Capacitors 320-1-320-2 cause a portion of common mode interference induced by interference 220 to be converted to differential mode interference. The differential mode interference is coupled to differential connection 235-4 and passed to chip 240.

Though capacitors 320-1-320-2 are illustrated only for transformer 310-4 for simplicity, it is to be appreciated and understood that any transformer among transformers 310-1-310-4 and transformers 315-1-315-4 may contain parasitic capacitors (not shown) similar to parasitic capacitors 320-1-320-2. Hence, differential mode interference can be coupled to each connection of differential connections 235-1-235-4 and passed to chip 240. Furthermore, transformers 310-1-310-4 and transformers 315-1-315-4 may couple common mode interference induced by interference 220 to each connection of differential connections 235-1-235-4 so that the coupled common mode interference is passed to chip 240. Hence, differential connections 235-1-235-4 may couple differential, data-bearing signals 205-1-205-4, common mode interference, and/or differential mode interference to chip 240, CMSC 260, and/or EMIC 270.

In contrast to systems in which one of transformers 310-1-310-4 contains a center-tap connection to a capacitor to form a common mode sense (CMS) signal, the techniques discussed herein require no such center-tap, capacitor, or CMS signal. As such, an additional pin on ICM 230 and/or interconnect on chip 240, costly special-purpose capacitor, special routing to isolate the center-tap-derived CMS signal from other signals, high-voltage path to chip 240, and/or higher cost of transformer construction, including an additional transformer core for isolation, can be avoided using the techniques described herein.

Figure 4:
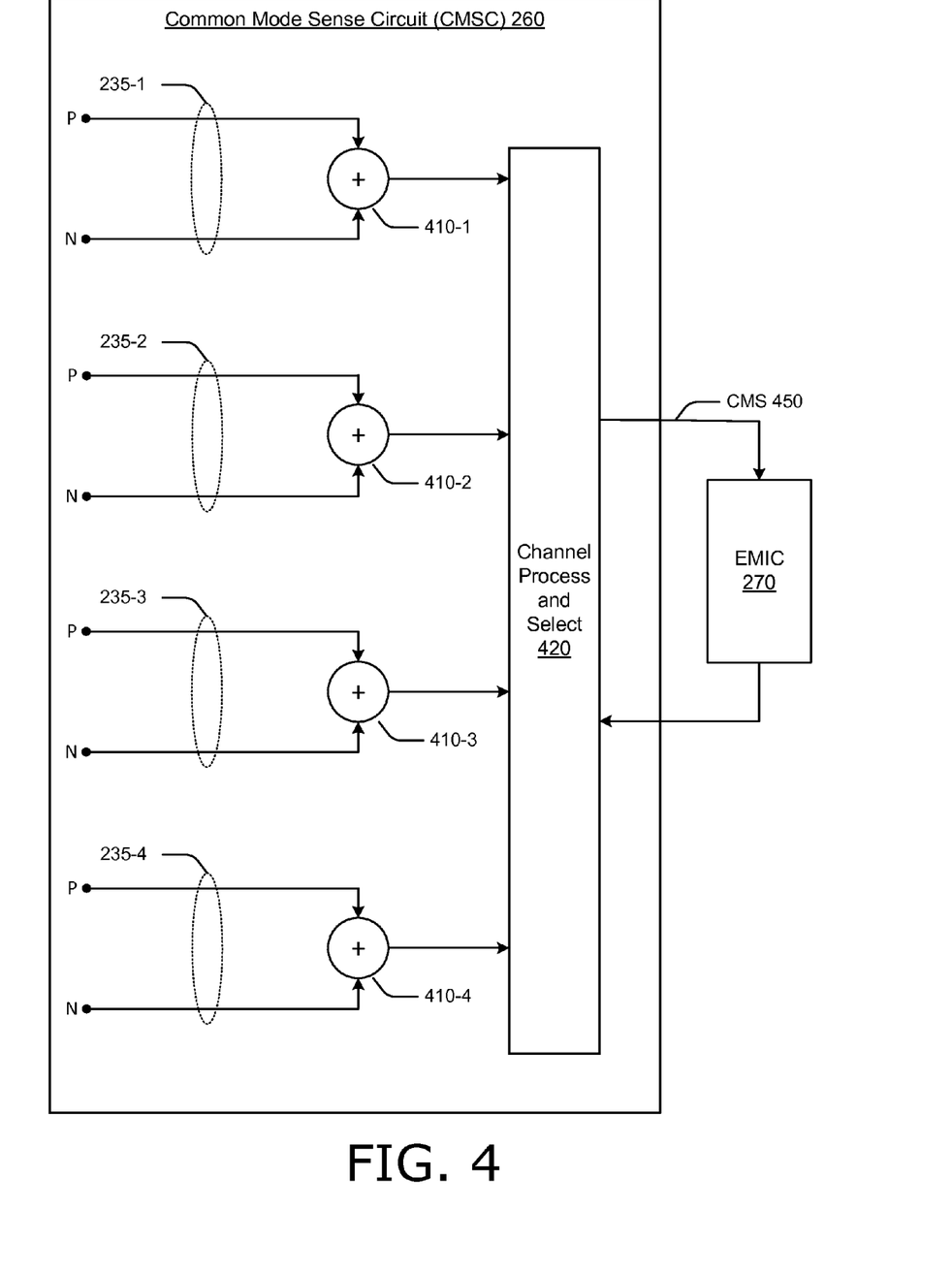
FIG. 4 illustrates an example common mode sense circuit in which aspects of a common mode sense circuit for use at a chip's differential pins can be implemented.

FIG. 4 illustrates an example CMSC 260 in which aspects of a common mode sense circuit for use at a chip's differential pins can be implemented. CMSC 260 accepts inputs from differential connections 235-1-235-4 and respectively sums each pair of connections comprising a differential connection of differential connections 235-1-235-4 in adders 410-1-410-4, respectively. Outputs of adders 410-1-410-4 are candidate sensed common mode signals and are passed to channel process and select 420, which may provide further candidate sensed common mode signals, and select at least one candidate sensed common mode signal, i.e., CMS signal 450, to be output to EMIC 270.

Because differential signals that have opposite polarities on P and N connections sum to zero, they are removed with adders 410-1-410-4. However, common mode signals that have the same polarity on P and N connections are passed to the output of adders 410-1-410-4. Hence, CMSC 260 acts to remove differential, data-bearing signals 205-1-205-4 and differential mode interference, while retaining common mode interference. Summing for each differential input may thus comprise removing at least part of a differential signal included in a pair of signals comprising the differential input, and passing at least part of a common mode signal included in the pair of signals. Therefore, outputs of adders 410-1-410-4 are candidate sensed common mode signals and are passed to channel process and select 420.

Channel process and select 420 selects at least one candidate sensed common mode signal to be provided to EMIC 270. The selected candidate sensed common mode signal may be used as a reference signal in EMIC 270 to cancel interference with an adaptive filter. For example, the selected candidate sensed common mode signal from CMSC 260 to EMIC 270 may be used to generate an error term in EMIC 270 that is used to adjust coefficients of at least one adaptive filter in EMIC 270.

In one or more embodiments, channel process and select 420 selects a candidate sensed common mode signal to be provided to EMIC 270 from among outputs of adders 410-1-410-4. For example, channel process and select 420 may set CMS signal 450 to one output of outputs of adders 410-1-410-4 by selecting a channel with a largest amplitude at adder outputs, largest amplitude on differential inputs to adders, or based on channel characteristics such as signal-to-noise ratio (SNR), signal-to-interference ratio (SIR), packet error rate (PER), packet loss rate, and the like. Alternatively or additionally, channel process and select 420 may set CMS signal 450 to comprise a plurality of outputs of adders 410-1-410-4.

Alternatively, channel process and select 420 calculates candidate sensed common mode signals other than those provided as outputs of adders 410-1-410-4. In one or more embodiments, channel process and select 420 sums outputs of adders 410-1-410-4 to form a candidate sensed common mode signal that may be set to CMS signal 450. Furthermore, channel process and select 420 may form a weighted sum of outputs of adders 410-1-410-4 to form a candidate sensed common mode signal, where weights are determined from an error signal, error signals, or signal derived from an error signal, from EMIC 270. Weights may also be determined from parameters associated with communication link 115, such as SNR, SIR, PER, number of uncorrected errors, and the like. Furthermore, sums calculated in channel process and select 420 may be normalized or non-normalized sums. Normalization may be done by a number of elements in the sum, or so that a normalized sum is set to within a specified range.

Alternatively or additionally, channel process and select 420 provides further processing of outputs of adders 410-1-410-4, including filtering, tonal detection and analysis, signal decomposition, averaging, and the like. For example, channel process and select 420 may filter outputs of adders 410-1-410-4 and sum only those filtered outputs which satisfy one or more criteria, such as signal strength and/or SNR being above/below a threshold.

Channel process and select 420 selects at least one candidate sensed common mode signal to form a selected candidate common mode signal, CMS signal 450, to be provided to EMIC 270. Unlike a CMS signal derived from a transformer's center-tap, CMS signal 450 from CMSC 260 provides a measure of common mode interference on chip 240 side of ICM 230, rather than on twisted-pair cable 215-1-215-4 side of ICM 230. Hence, CMS signal 450 is sensed at the differential input to chip 240, and therefore provides an accurate measure of common mode interference that chip 240 sees. Furthermore, CMS signal 450 requires no additional pin on ICM 230 or special transformer. In addition, CMS signal 450 may be sensed using all pairs of connections comprising differential connections 235-1-235-4, rather than only a single pair of connections. In one or more embodiments, EMIC 270 uses CMS signal 450 from CMSC 260 to cancel interference in signals calculated from differential connections 235-1-235-4.

It should be noted that although CMSC 260 is discussed as generating candidate sensed common mode signals for each of differential connections 235-1-235-4, alternatively CMSC 260 may generate candidate sensed common mode signals for less than all of the differential connections 235-1-235-4. For example, CMSC 260 may not include an adder 410-2, in which case channel process and select 420 selects or calculates a candidate sensed common mode signal based on the candidate sensed common mode signals generated by adders 410-1, 410-3, and 410-4.

Figure 5:
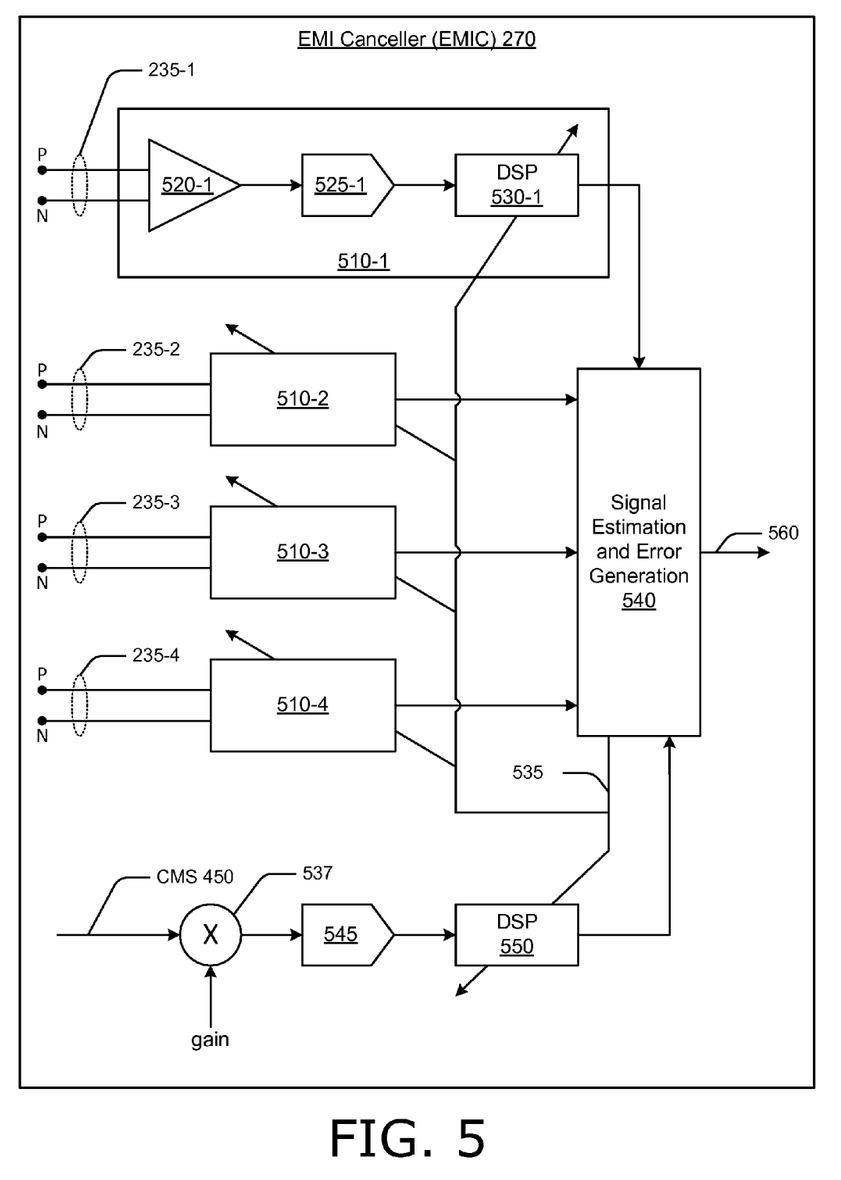
FIG. 5 illustrates an interference canceller in which aspects of a common mode sense circuit for use at a chip's differential pins can be implemented.

FIG. 5 illustrates an example EMIC 270 in which aspects of a common mode sense circuit for use at a chip's differential pins can be implemented. EMIC 270 is coupled to differential connections 235-1-235-4 at processing blocks 510-1-510-4, respectively. For simplicity, processing block 510-1 is shown in more detail than processing blocks 510-2-510-4. However, it is to be appreciated and understood that processing blocks 510-2-510-4 contain similar circuitry to processing block 510-1.

Processing block 510-1 contains differential-to-single-ended converter 520-1, analog-to-digital converter 525-1 and digital signal processing (DSP) block 530-1. Differential-to-single-ended converter 520-1 is coupled to differential connection 235-1 and converts differential connection 235-1 to a single-ended signal. For example, differential-to-single-ended converter 520-1 may take a difference of voltages on each connection comprising differential connection 235-1. Analog-to-digital converter 525-1 samples outputs of differential-to-single-ended converter 520-1 and provides digital samples to DSP 530-1. DSP 530-1 optionally includes filtering, re-sampling, gain correction, averaging, and other digital signal processing. For example, DSP 530-1 may also include at least one adaptive filter that contains filter coefficients that can be adjusted according to an error term, such as error term 535 generated in signal estimation and error generation 540.

DSP 530-1 includes adaptive filters implemented in time or frequency domains. An adaptive filter may include a linear, transversal filter that implements a finite impulse response (FIR). An adaptive filter may also include a linear, transversal filter within a feedback structure that implements an infinite impulse response (IIR).

Processing blocks 510-2-510-4 are coupled to differential connections 235-2-235-4, respectively, and each of processing blocks 510-2-510-4 contains similar circuitry as processing block 510-1. For example, processing blocks 510-2-510-4 may also contain adaptive filters with coefficients configured to be adjusted using error term 535. Processing blocks 510-1-510-4 may contain circuits that calculate, or are coupled to circuitry that provides, tone detection logic that detects at least one tone. At least one adaptive filter may be configured according to the detected tone. For example, at least one adaptive filter may process data that has been filtered to contain at least one detected tone.

CMS signal 450 from CMSC 260 is coupled to EMIC 270 and is multiplied by a gain using multiplier 537. The result of the multiplication is digitized by analog-to-digital converter 545. DSP 550 processes digitized samples from analog-to-digital converter 545. DSP 550 may include filtering, re-sampling, gain correction, averaging, and other digital signal processing. For example, DSP 550 may also include at least one adaptive filter that contains filter coefficients that filter a digitized version of CMS signal 450 and can be adjusted according to an error term, such as error term 535 from signal estimation and error generation 540.

Signal estimation and error generation 540 generates error term 535 and provides signal estimate 560 that can be further processed by chip 240. Signal estimation and error generation 540 removes interference in signals on differential connections 235-1-235-4 to produce signal estimate 560. For example, signal estimation and error generation 540 may subtract a signal derived from a candidate sensed common mode signal from a signal derived from at least one differential input connection of differential connections 235-1-235-4 to remove interference.

In one or more embodiments, signal estimation and error generation 540 subtracts a signal derived from a candidate sensed common mode signal from signals derived from each differential input connections of differential connections 235-1-235-4. Additionally or alternatively, CMS signal 450 comprises a plurality of candidate sensed common mode signals, and signals derived from each candidate sensed common mode signal among the plurality of candidate sensed common mode signals are subtracted from signals derived from each differential input connection of differential connections 235-1-235-4.

Signal estimation and error generation 540 generates an error term derived from CMS signal 450. For example, CMS signal 450, or a signal derived from CMS signal 450, may be used as a reference signal for an adaptive filter. A reference signal is a signal with known properties that can be exploited in the adaptation process. A reference signal may be used to generate an error term by comparing a signal to the reference signal. An error term may also be derived from signal estimate 560, which is derived from a signal derived from a candidate sensed common mode signal. Signal estimate 560 may be compared to a reference signal and/or a quantized version of signal estimate 560 to generate an error term. Error term 535 may comprise a plurality of error terms. Error terms may be in the time domain, frequency domain, or sub-space of a domain.

Adaptive filters in EMIC 270 may use CMS signal 450, or a signal derived from CMS signal 450, in any suitable way to update coefficients of an adaptive filter. It is to be appreciated and understood that EMIC 270 in FIG. 5 is illustrative only and does not purport to be limiting in any way. Interference canceller architectures other than that illustrated in FIG. 5 are also considered to be within the scope of the disclosure. One skilled in the art will recognize the benefits of using CMS signal 450 as a reference signal to update coefficients of adaptive filters in an interference canceller.

Figure 6:
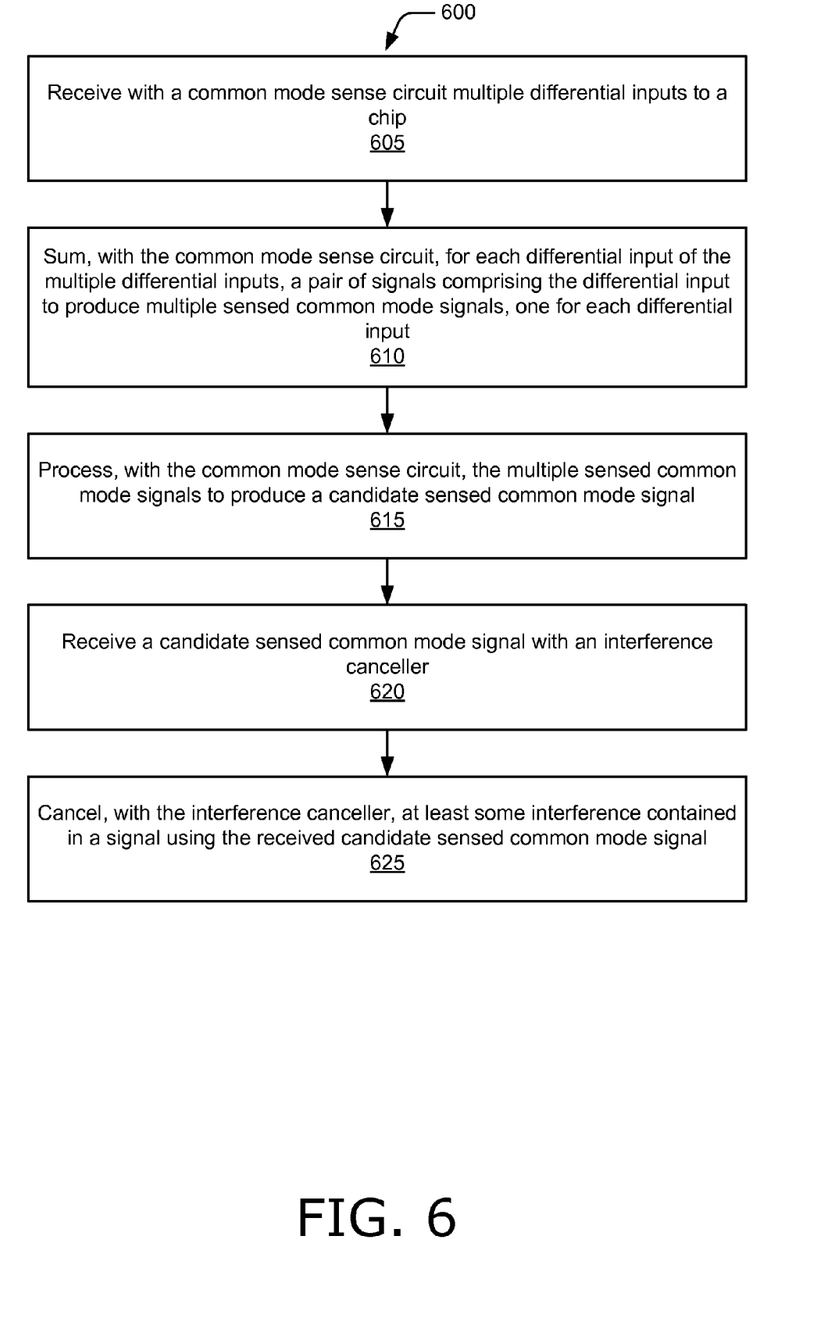
FIG. 6 illustrates example operations in which aspects of a common mode sense circuit for use at a chip's differential pins can be implemented.

FIG. 6 illustrates example operations in which aspects of a common mode sense circuit for use at a chip's differential pins can be implemented. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, field-programmable gate arrays (FPGAs), application-specific integrated circuits (ASICs), application-specific standard products (ASSPs), system-on-a-chip systems (SoCs), complex programmable logic devices (CPLDs), and the like.

FIG. 6 illustrates example method(s) 600 of a common mode sense circuit for use at a chip's differential pins. The order in which the method is described is not intended to be construed as a limitation, and any number of the described method operations can be combined in any order to implement the method, or an alternate method. The specific order or hierarchy of method operations may be re-arranged, amended, and/or modified without departing from the scope of the disclosure.

At 605, a common mode sense circuit receives multiple differential inputs to a chip, which may be included as part of a receiver. For example, the common mode sense circuit may be CMSC 260 in FIG. 2 and FIG. 4, the differential inputs may be inputs from differential connections 235-1-235-4, and the chip may be chip 240.

At 610 a common mode sense circuit sums, for each differential input of the multiple differential inputs, a pair of signals comprising the differential input to produce multiple sensed common mode signals, one for each differential input. For example, the common mode sense circuit may be CMSC 260 in FIG. 4 that sums pairs of inputs from differential connections 235-1-235-4 with adders 410-1-410-4, respectively, and provides candidate sensed common mode signals to channel process and select 420.

At 615, the common mode sense circuit processes the multiple sensed common mode signals and produces at least one candidate sensed common mode signal. For example, the at least one candidate sensed common mode signal, may be CMS signal 450 in FIG. 4. In one or more embodiments, the multiple sensed common mode signals are summed and a result of the summing is set to a candidate sensed common mode signal. For example, channel process and select 420 may sum outputs of adders 410-1-410-4 to generate a candidate sensed common mode signal. Alternatively, one of outputs of adders 410-1-410-4 may be set to a candidate sensed common mode signal. Additionally or alternatively, channel process and select 420 may generate an additional candidate sensed common mode signal and select it as a candidate sensed common mode signal. For example, a weighted average may be formed from outputs of adders 410-1-410-4 and set to a candidate sensed common mode signal.

At 620, an interference canceller receives the candidate sensed common mode signal. For example, EMIC 270 receives CMS signal 450 in FIG. 4.

At 625, the interference canceller cancels at least some interference contained in a signal using the received candidate sensed common mode signal. For example, EMIC 270 in FIG. 5 outputs signal estimate 560, which is determined using a signal derived from CMS signal 450 in signal estimation and error generation 540.

Figure 7:
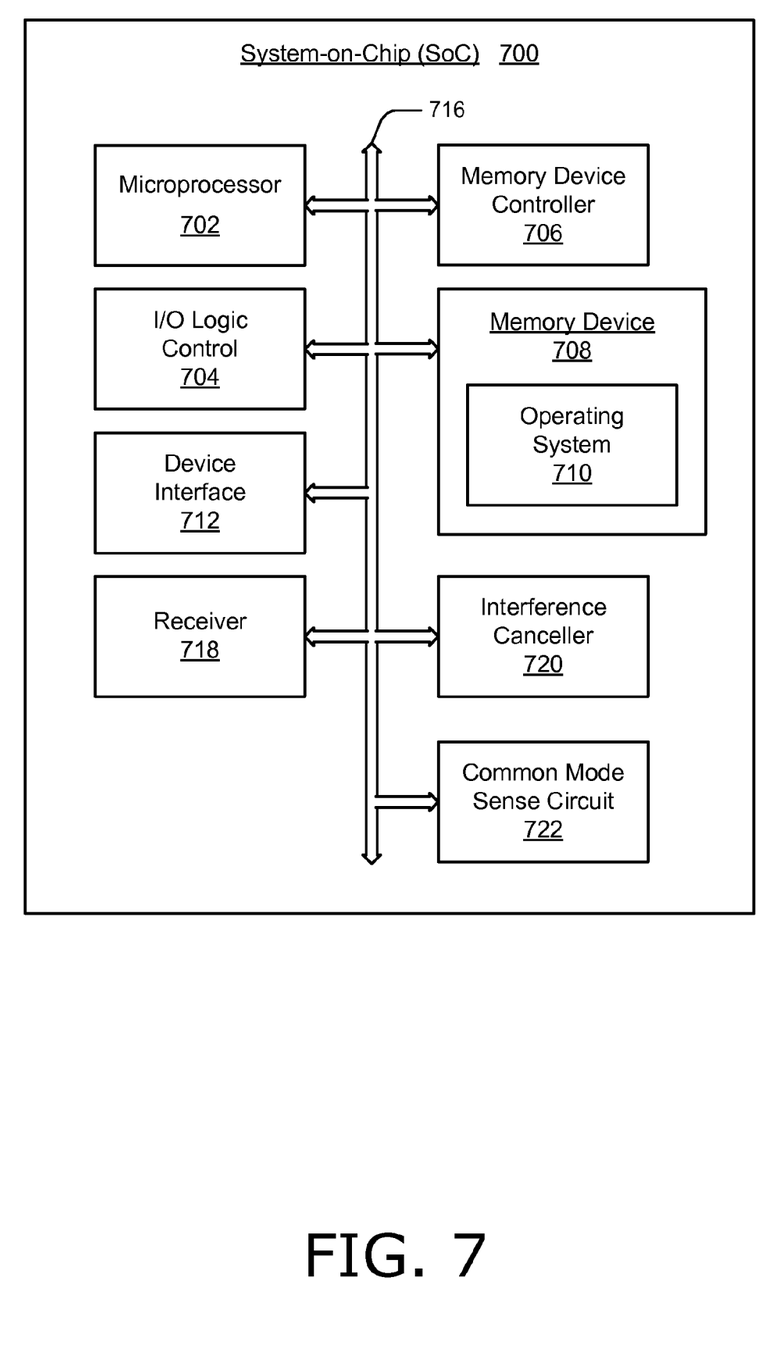
FIG. 7 illustrates an example system-on-chip (SoC) environment in which aspects of a common mode sense circuit for use at a chip's differential pins can be implemented.

FIG. 7 illustrates an example system-on-chip (SoC) 700, which implements various aspects of a common mode sense circuit for use at a chip's differential pins, as described herein. The SoC may be implemented in any type of electronic or computing device that may be implemented as any type of computer, mobile phone, tablet device, digital camera, multimedia device, printer, or similar device. The SoC 700 can be integrated with electronic circuitry, a microprocessor, memory, input output (I/O) logic control, communication interfaces and components, as well as other hardware, firmware, and/or software to implement an electronic or computing device.

In this example, the SoC 700 is integrated with a microprocessor 702 (e.g., any of a microcontroller or digital signal processor) and input-output (I/O) logic control 704 (e.g., to include electronic circuitry). The SoC 700 includes a memory device controller 706 and a memory device 708, such as any type of a nonvolatile memory and/or other suitable electronic data storage device. The SoC 700 can also include various firmware and/or software, such as an operating system 710 that is maintained by the memory and executed by the microprocessor.

The SoC 700 includes a device interface 712 to interface with a device or other peripheral component, such as when installed in an electronic or computing device. The SoC 700 also includes an integrated data bus 716 that couples the various components of the SoC for data communication between the components. The data bus in the SoC may also be implemented as any one or a combination of different bus structures and/or bus architectures.

In aspects of a common mode sense circuit for use at a chip's differential pins, the SoC 700 includes receiver 718. Receiver 718 may comprise parts of receiver 210 in FIG. 2, such as EMIC 270 and/or CMSC 260 in FIG. 2. Alternatively or additionally, interference canceller 720 may comprise EMIC 270 in FIGS. 2 and 5, and/or a common mode sense circuit 722 to sense a common mode signal, such as a common mode signal on differential inputs comprising a twisted-pair cable, may comprise CMSC 260 in FIG. 4.

Figure 8:
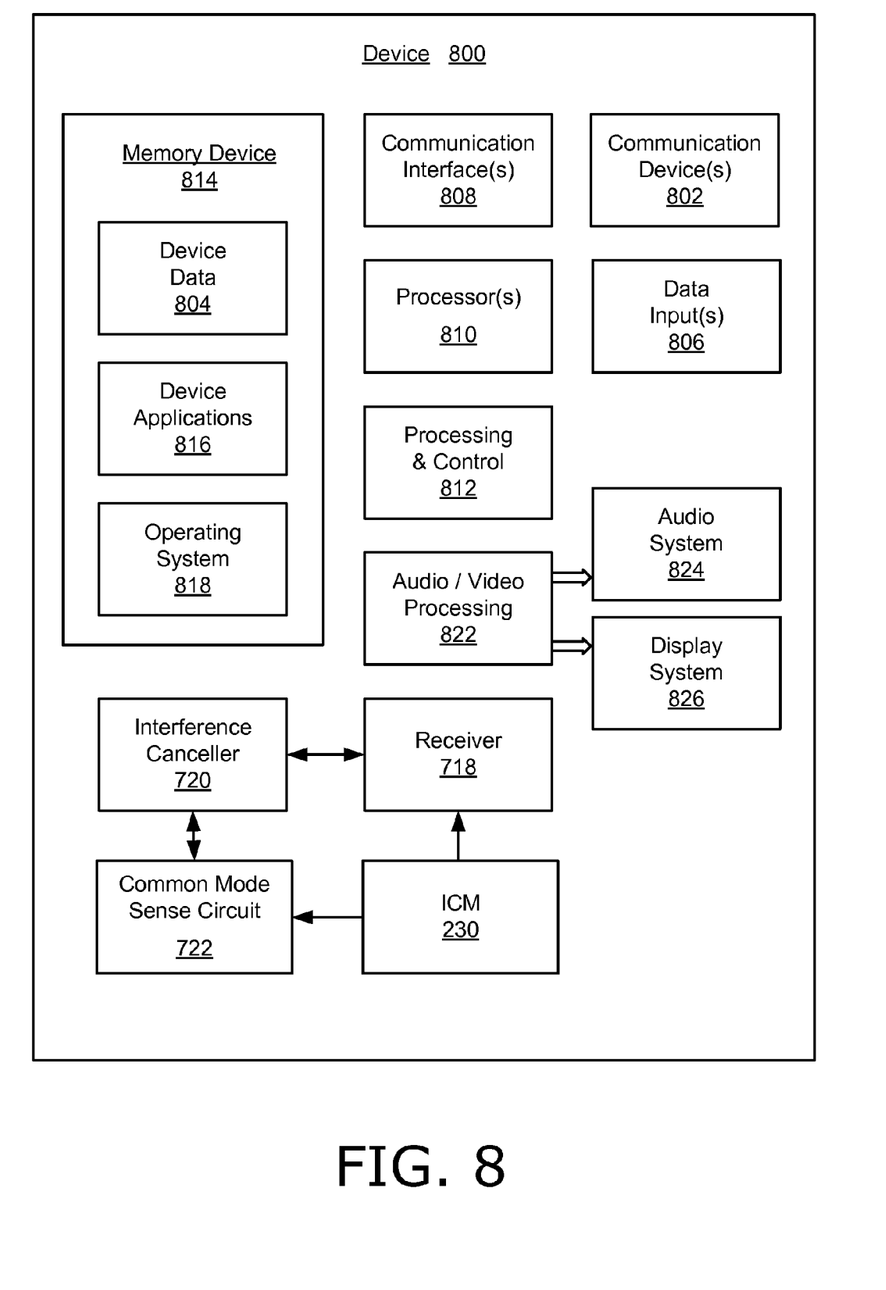
FIG. 8 illustrates various components of an example device that can implement aspects of a common mode sense circuit for use at a chip's differential pins.

FIG. 8 illustrates various components of an example device 800 that can be implemented as any of the devices or systems described with reference to the previous FIGS. 1-7, such as any type of an electronic or computing device. The device 800 may also be implemented to include the example system-on-chip (SoC) described with reference to FIG. 7. The device 800 may be associated with a user (i.e., a person) and/or an entity that operates the device such that a device describes logical devices that include users, software, firmware, hardware, and/or a combination of devices.

The device 800 includes communication devices 802 that enable wired and/or wireless communication of device data 804, such as received data, data that is communicated between devices, data packets of the data, etc. The device 800 also includes one or more data inputs 806 via which any type of data, media content, and/or inputs can be received, such as user-selectable inputs and any other type of audio, video, and/or image data received from any content and/or data source. The data inputs 806 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices. For example, an Ethernet may be used to couple data between devices that support an IEEE 802.3 standard.

The device 800 also includes communication interfaces 808, such as any one or more of a serial, parallel, network, or wireless interface. The communication interfaces provide a connection and/or communication links between the device and a network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 includes one or more processors 810 (e.g., any of microprocessors, controllers, and the like), or a processor and memory system (e.g., implemented in an SoC), which processes computer-executable instructions to control the operation of the device. Alternatively or in addition, the device can be implemented with any one or combination of software, hardware, firmware, or fixed logic circuitry that is implemented in connection with processing and control circuits which are generally identified at 812.

The device 800 also includes one or more memory devices 814 (e.g., computer-readable storage memory) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any suitable electronic data storage that is accessed by a computing device.

A memory device 814 provides data storage mechanisms to store the device data 804, other types of information and/or data, and device applications 816. For example, an operating system 818 can be maintained as a software application with the memory device and executed on the processors. The device applications may also include a device manager or controller, such as any form of a control application, software application, signal processing and control module, code that is native to a particular device, a hardware abstraction layer for a particular device, and so on.

The device 800 may also include an audio and/or video processing system 822 that generates audio data for an audio system 824 and/or generates display data for a display system 826. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

In this example, the device 800 includes an integrated connector module (ICM) 230 that may be implemented in connection with other components of device 800. Receiver 718 may comprise receiver 210 in FIG. 2, and interference canceller 720 may comprise EMIC 270 in FIGS. 2 and 5. In this example, the device 800 also includes a common mode sense circuit 722 to sense a common mode signal, such as a common mode signal on differential inputs comprising a twisted-pair cable. An example of common mode sense circuit 722 is CMSC 260 in FIG. 4.

Although aspects of a common mode sense circuit for use at a chip's differential pins have been described in language specific to features and/or methods, the appended claims are not necessarily limited to the specific features or methods described. Rather the specific features and methods are disclosed as example implementations of a common mode sense circuit for use at a chip's differential pins, and other equivalent features and methods are intended to be within the scope of the appended claims. Further, various different aspects are described and it is to be appreciated that each described aspect can be implemented independently or in connection with one or more other described aspects.

Further aspects of the present invention relate to one or more of the following clauses.

In at least some aspects, a method for processing a signal containing interference comprises receiving, with a common mode sense circuit, multiple differential inputs to a chip;

summing, with the common mode sense circuit, for each differential input of the multiple differential inputs, a pair of signals comprising the differential input to produce multiple sensed common mode signals, one sensed common mode signal for each differential input; processing, with the common mode sense circuit, the multiple sensed common mode signals to produce a candidate sensed common mode signal; receiving, with an interference canceller, the candidate sensed common mode signal; and cancelling, with the interference canceller, at least some of the interference contained in the signal using the received candidate sensed common mode signal.

The processing the multiple sensed common mode signals may further comprise summing the multiple sensed common mode signals and setting a result of the summing to the candidate sensed common mode signal.

The processing the multiple sensed common mode signals may further comprise selecting one of the multiple sensed common mode signals as the candidate sensed common mode signal.

The summing for each differential input of the multiple differential inputs may further comprise removing at least part of a differential signal included in the pair of signals and passing at least part of a common mode signal included in the pair of signals.

None of the multiple differential inputs may comprise an input from a center tap of a transformer and the chip does not accept an input from a center tap of a transformer.

The cancelling may include at least subtracting the candidate sensed common mode signal from a signal derived from at least one of the plurality of differential inputs.

The common mode sense circuit, the chip, and the interference canceller may be embodied on a system-on-chip (SoC).

The multiple differential inputs to the chip may be coupled from an integrated connector module so as to provide a connector interface from twisted-pair wire cable to the chip.

The cancelling may include adjusting coefficients of at least one adaptive filter and the adjusting is done using the candidate sensed common mode signal as a reference signal.

The cancelling may include detecting at least one tone and the at least one adaptive filter is configured according to the detected at least one tone.

In at least some aspects, a device for processing a signal containing interference comprises a receiver including a chip, and a common mode sense circuit configured to receive at least one differential input to the chip; sum, for each differential input of the at least one differential input, a pair of signals comprising the differential input to produce at least one sensed common mode signal, one sensed common mode signal for each differential input; and process the at least one sensed common mode signal to produce a candidate sensed common mode signal. The device also comprises an interference canceller configured to cancel at least some of the interference contained in the signal using the candidate sensed common mode signal.

To process the at least one sensed common mode signal may further comprise summing multiple sensed common mode signals and setting a result of the summing to the candidate sensed common mode signal.

To process the at least one sensed common mode signal may further comprise selecting one of the at least one sensed common mode signal as the candidate sensed common mode signal.

The at least one differential input may comprise four differential inputs according to Institute of Electrical and Electronics Engineers (IEEE) 802.3-2012, entitled "IEEE Standard for Ethernet", Dec. 28, 2012.

The interference canceller may include at least a circuit configured to subtract the candidate sensed common mode signal from a signal derived from the at least one differential input.

The interference canceller includes at least one adaptive filter whose coefficients can be adjusted using the candidate sensed common mode signal as a reference signal.

The device may further comprise an integrated connector module configured to couple the at least one differential input to the chip so as to provide a connector interface from twisted-pair wire cable to the chip.

In at least some aspects, a system comprises a receiver including a chip; an integrated connector module configured to couple at least one differential input to the chip so as to provide a connector interface from a signal containing interference to the chip; and a common mode sense circuit configured to receive at least one differential input to the chip; sum, for each differential input of the at least one differential input, a pair of signals comprising the differential input to produce at least one sensed common mode signal, one sensed common mode signal for each differential input; and process the at least one sensed common mode signal to produce a candidate sensed common mode signal. The system also comprises an interference canceller configured to cancel at least some of the interference contained in the signal using the candidate sensed common mode signal.

To process the at least one sensed common mode signal may further comprise summing a plurality of sensed common mode signals and setting a result of the summing to the candidate sensed common mode signal; or selecting one signal of the at least one sensed common mode signal and setting the selected one signal to the candidate sensed common mode signal.

The interference canceller may include at least one adaptive filter whose coefficients can be adjusted using the candidate sensed common mode signal as a reference signal.

What is claimed is:

1. A method for processing a signal containing interference, the method comprising:
   receiving, at a common mode sense circuit that is coupled to multiple differential inputs of a chip, a pair of signals on each of the multiple differential inputs, at least one of the pairs of signals including a signal containing interference;
   summing, with the common mode sense circuit and for each differential input of a subset of the multiple differential inputs, the pair of signals received on the differential input of the subset to provide a respective sensed common mode signal for each differential input of the subset, the summing providing multiple respective sensed common mode signals for the subset of the multiple differential inputs;
   processing, with the common mode sense circuit, the multiple respective sensed common mode signals of the subset of the multiple differential inputs to produce a candidate sensed common mode signal based at least in part on relative amplitudes of the multiple respective sensed common mode signals;
   receiving, at an interference canceller, the candidate sensed common mode signal from the common mode sense circuit; and
   cancelling, with the interference canceller, at least some of the interference in the signal containing interference using the candidate sensed common mode signal that is received from the common mode sense circuit.

2. The method as recited in claim 1, wherein the processing the multiple respective sensed common mode signals further comprises summing the multiple respective sensed common mode signals and setting, as the candidate sensed common mode signal, the sum of the multiple respective sensed common mode signals.

3. The method as recited in claim 1, wherein the processing the multiple respective sensed common mode signals further comprises selecting one of the multiple respective sensed common mode signals as the candidate sensed common mode signal.

4. The method as recited in claim 1, wherein summing the pair of signals for each differential input of the subset of the multiple differential inputs further comprises:
  removing at least part of a differential signal included in the pair of signals; and
  passing at least part of a common mode signal included in the pair of signals.

5. The method as recited in claim 1, wherein none of the multiple differential inputs comprise an input from a center tap of a transformer and the chip does not accept an input from a center tap of a transformer.

6. The method as recited in claim 1, wherein the cancelling includes at least subtracting the candidate sensed common mode signal from the signal containing interference.

7. The method as recited in claim 1, wherein the common mode sense circuit, the chip, and the interference canceller are embodied as a system-on-chip (SoC).

8. The method as recited in claim 7, wherein the multiple differential inputs of the chip are coupled to an integrated connector module so as to provide a connector interface from a twisted-pair wire cable to the chip.

9. The method as recited in claim 1, wherein the cancelling includes adjusting coefficients of at least one adaptive filter of the interference canceller and the adjusting is performed using the candidate sensed common mode signal as a reference signal.

10. The method as recited in claim 9, wherein the cancelling includes detecting at least one tone and the at least one adaptive filter of the interference canceller is configured according to the at least one tone that is detected.

11. The method as recited in claim 1, wherein each of the multiple differential inputs of the subset is connected to a respective adder of the common mode sense circuit that performs the summing.

12. The method as recited in claim 11, wherein differential inputs not of the subset are not connected to an adder in the common mode sense circuit.

13. A device for processing a signal containing interference, comprising:
  a receiver including a chip;
  a common mode sense circuit coupled to multiple differential inputs and configured to:
    receive a pair of signals on each of the multiple differential inputs, at least one of the pairs of signals including a signal containing interference;
    sum, for each differential input of the multiple differential inputs, the pair of signals received on the differential input to provide a respective sensed common mode signal for each differential input, the summing providing multiple respective sensed common mode signals for the multiple differential inputs; and
    process the multiple respective sensed common mode signals of the multiple differential inputs to produce a candidate sensed common mode signal based at least in part on relative amplitudes of the multiple respective sensed common mode signals; and
  an interference canceller configured to:
    receive the candidate sensed common mode signal from the common mode sense circuit; and
    cancel at least some of the interference in the signal containing interference using the candidate sensed common mode signal.

14. The device as recited in claim 13, wherein to process the multiple respective sensed common mode signals further comprises summing the multiple respective sensed common mode signals and setting, as the candidate sensed common mode signal, the sum of the multiple respective sensed common mode signals.

15. The device as recited in claim 13, wherein to process the multiple respective sensed common mode signals further comprises selecting one of the multiple respective sensed common mode signals as the candidate sensed common mode signal.

16. The device as recited in claim 13, wherein the multiple differential inputs comprise four differential inputs according to Institute of Electrical and Electronics Engineers (IEEE) 802.3-2012, entitled "IEEE Standard for Ethernet", Dec. 28, 2012.

17. The device as recited in claim 13, wherein the interference canceller includes at least a circuit configured to subtract the candidate sensed common mode signal from the signal containing interference.

18. The device as recited in claim 13, wherein the interference canceller includes at least one adaptive filter whose coefficients can be adjusted using the candidate sensed common mode signal as a reference signal.

19. The device as recited in claim 13, further comprising an integrated connector module configured to couple the multiple differential inputs to the chip so as to provide a connector interface from a twisted-pair wire cable to the chip.

20. A system comprising:
  a receiver including a chip;
  an integrated connector module configured to:
    receive multiple signals containing interference;
    process the multiple signals to produce multiple pairs of signals;
    and couple each pair of the multiple pairs of signals to a respective differential input of multiple differential inputs of the chip;
  a common mode sense circuit configured to:
    receive the multiple pairs of signals on the respective multiple differential inputs of the chip;
    sum, for each differential input of the multiple differential inputs, the pair of signals received on the differential input to provide a respective sensed common mode signal for each differential input of the multiple differential inputs, the summing providing multiple respective sensed common mode signals for the multiple differential inputs; and
    process the multiple respective sensed common mode signals of the multiple differential inputs to produce a candidate sensed common mode signal based at least in part on relative amplitudes of the multiple respective sensed common mode signals; and
  an interference canceller configured to:
    receive the candidate sensed common mode signal from the common mode sense circuit; and
    cancel at least some of the interference contained in the multiple signals containing interference using the candidate sensed common mode signal.

21. The system as recited in claim 20, wherein at least one of the multiple signals containing interference includes differential data and is received on a twisted-pair wire cable.

22. The system as recited in claim 20, wherein the interference canceller includes at least one adaptive filter whose coefficients can be adjusted using the candidate sensed common mode signal as a reference signal.

\* \* \* \* \*